(12) United States Patent
Laurent et al.

(10) Patent No.: US 7,401,794 B2
(45) Date of Patent: Jul. 22, 2008

(54) VEHICLE WITH A SUSPENSION SYSTEM THAT ALLOWS INDIVIDUAL SUSPENSION OF THE WHEELS AND ACTIVE CONTROL OF THE BODY HEIGHT

(75) Inventors: Daniel Laurent, Marly (CH); Daniel Walser, Fribourg (CH)

(73) Assignee: Conception et Developpement Michelin S.A., Givisiez (CH)

( * ) Notice: Subject to any disclaimer, the term of this patent is extended or adjusted under 35 U.S.C. 154(b) by 339 days.

(21) Appl. No.: 11/182,447

(22) Filed: Jul. 15, 2005

(65) Prior Publication Data

US 2006/0017240 A1   Jan. 26, 2006

(30) Foreign Application Priority Data

Jul. 15, 2004   (FR)   ................................. 04 07897

(51) Int. Cl.
*B60G 3/18*   (2006.01)
(52) U.S. Cl. ............................ 280/5.514; 280/124.134; 280/124.135; 280/124.136
(58) Field of Classification Search ............. 280/5.514, 280/124.134, 124.135, 124.136
See application file for complete search history.

(56) References Cited

U.S. PATENT DOCUMENTS

| | | | | |
|---|---|---|---|---|
| 2,152,938 | A * | 4/1939 | Welch ................. | 280/124.103 |
| 4,168,082 | A | 9/1979 | Hendrickson et al. | |
| 5,547,207 | A | 8/1996 | Madler et al. | |
| 5,580,089 | A | 12/1996 | Kolka et al. | |
| 6,113,119 | A * | 9/2000 | Laurent et al. ........... | 280/124.1 |
| 6,161,844 | A * | 12/2000 | Charaudeau et al. ..... | 280/5.515 |
| 6,170,838 | B1 * | 1/2001 | Laurent et al. ........... | 280/5.508 |
| 6,257,604 | B1 * | 7/2001 | Laurent et al. ......... | 280/124.127 |
| 6,311,795 | B1 * | 11/2001 | Skotnikov et al. ............ | 180/8.3 |
| 6,467,783 | B1 * | 10/2002 | Blondelet et al. ..... | 280/124.106 |

(Continued)

FOREIGN PATENT DOCUMENTS

EP   0878 332 B1   11/1998

(Continued)

*Primary Examiner*—Christopher Ellis
*Assistant Examiner*—Jacob Meyer
(74) *Attorney, Agent, or Firm*—Cohen Pontani Lieberman & Pavane LLP

(57) ABSTRACT

A vehicle having a suspended body (1), at least two wheels (2) each mounted on a wheel support. Each wheel support is mounted on a suspension device (5) comprising a suspension support (4) and means for guiding the wheel support relative to the suspension support. The suspension device allows a vertical displacement of the wheel support relative to the suspension support, the size of the displacement being sufficient to produce the vertical suspension movement required. At least one wheel is arranged transversely on one side of the body and at least one other wheel is arranged on the other side of the body. Each suspension support is connected to the body by a height variation mechanism (3, 7, 11, 12) which allows the relative height of the suspension support relative to the body (1) to be varied. Each height variation mechanism is actuated by height control means (15, 16, 17, 18). The vehicle has centralised control means (19) for the height control means, and the action of the height control means on each side of the body is coordinated so that on that side of the body, the relative height of each suspension support is varied simultaneously.

13 Claims, 5 Drawing Sheets

U.S. PATENT DOCUMENTS 6,547,260 B2 * 4/2003 Laurent et al. ........... 280/5.509
2007/0182120 A1 * 8/2007 Tonoli et al. .......... 280/124.142

FOREIGN PATENT DOCUMENTS

| EP | 0878 378 A1 | 11/1998 |
| FR | 2 053 817 | 4/1971 |
| FR | 2 582 997 | 12/1986 |
| FR | 2 700 501 | 7/1994 |
| WO | WO 96/08959 A1 | 3/1996 |

* cited by examiner

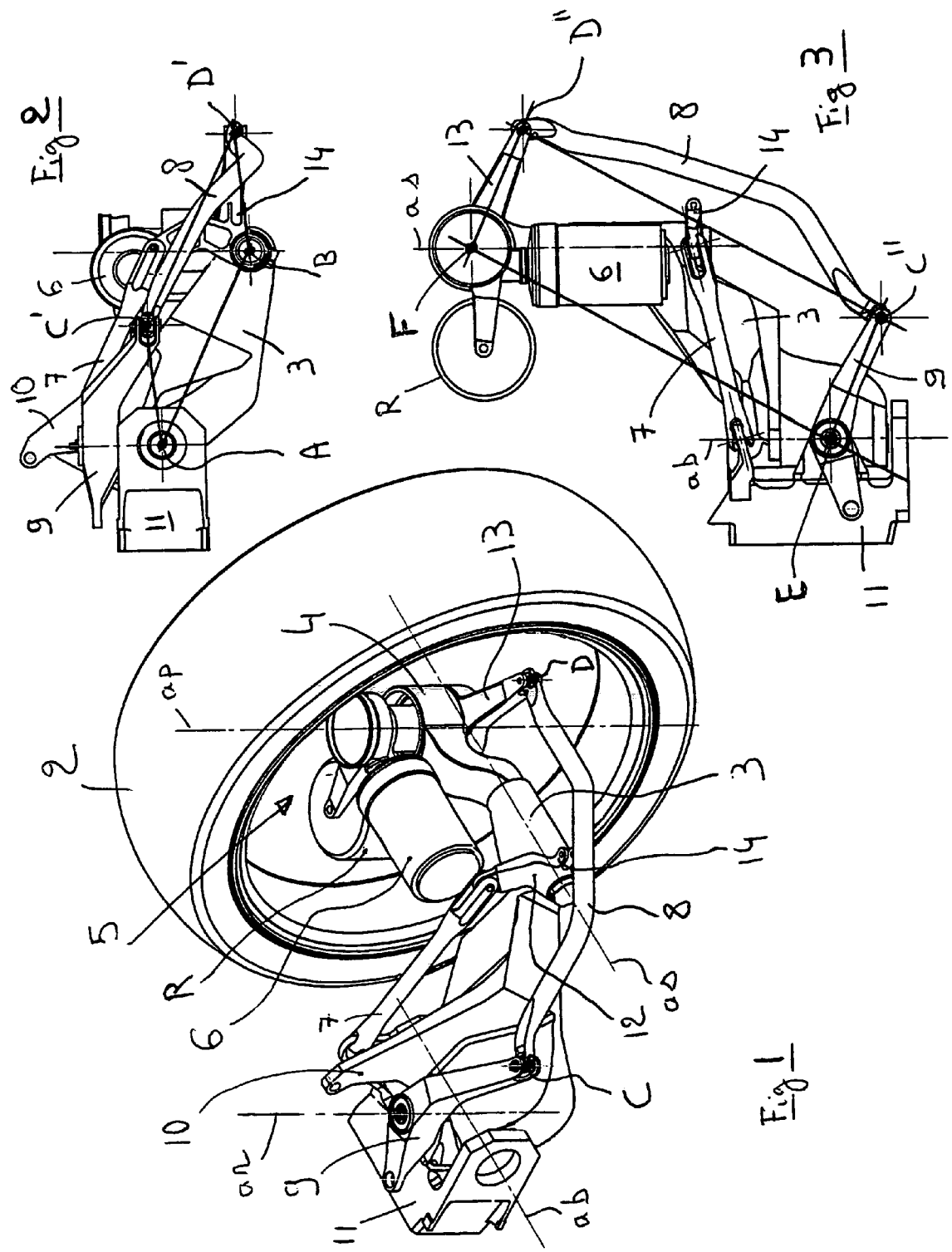

VEHICLE WITH A SUSPENSION SYSTEM THAT ALLOWS INDIVIDUAL SUSPENSION OF THE WHEELS AND ACTIVE CONTROL OF THE BODY HEIGHT

BACKGROUND OF THE INVENTION

1. Field of the Invention

The present invention concerns the ground contact system of vehicles, in particular road vehicles. It concerns both the guiding of the wheels relative to the vehicle body, and the control of the level of the vehicle body, in particular its height and roll.

2. Background of the Invention

The purpose of the wheel guiding system is to ensure a rigorously controlled position of the wheel plane relative to the chassis or body of a vehicle during vertical movements of the suspension. In general, it is easy to identify a plane of symmetry on a vehicle. This longitudinal and vertical plane will be taken as a basis of reference related to the chassis. Remember that the "wheel plane" is the plane perpendicular to the rotation axis of the wheel and passing through the centre of the ground contact area of a tire or elastic cover fitted on the wheel. It is common to call the vertical displacement of the wheel relative to the chassis the "vertical suspension". The "camber" or "camber angle" is the angle between the wheel plane and a line perpendicular to the ground. "Steering" is the rotation of the wheel plane about a line perpendicular to the ground and passing through the centre of the contact area of the tire on the ground. Finally, the "roll" or "body roll" is the tilting of the body around a longitudinal axis.

The guiding of the wheel plane directly induces the attitude of the tire on the ground, and thus influences the forces undergone by the tire and whether it is in a more or less favourable position for transmitting forces, in particular transverse forces. Now, it is known that those forces are all-important for the vehicle's behaviour and thus for safety.

As is known, road vehicles as used nowadays undergo a rolling motion when rounding a curve, simply by virtue of their suspension. In effect, the centrifugal force results in a load transfer towards the outside of the curve, whose consequence is to increase the compression of the wheel suspensions on the outside of the curve and relax the suspensions on the inside of the curve, hence the roll. This rolling is prejudicial for the comfort of passengers but also for the road holding of the vehicle, particularly because of the wheel camber variation it causes. The most common way currently used to reduce this roll consists in using one or more so-termed "anti-roll" bars. Unfortunately, an anti-roll bar can only restrict roll, by opposing it with a reaction torque. Owing to its principle, it can only limit the amount of roll and cannot therefore totally prevent the camber variations of the wheels in a direction unfavourable to proper operation of the tires. Moreover, although the roll is reduced, the load transfer still takes place and this unequal load distribution on the tires tends to reduce the overall grip potential of the vehicle.

Patent application EP 0 878 378 discloses a vehicle that comprises a camber control mechanism which, viewed in a vertical plane perpendicular to the longitudinal axis of the vehicle, forms a deformable parallelogram. This vehicle uses a vertical suspension system with a slide located in the wheel. The passenger compartment of the vehicle can also tilt relative to the chassis, so that passengers will not be so much affected by the transverse forces due to the centrifugal force. The system enables rigorous control of the orientation of the wheel plane and body. However, this arrangement is rather bulky.

SUMMARY OF THE INVENTION

One object of the present invention is to enable active control of the body height and/or the roll, while allowing the same degrees of freedom of movement for the wheel plane relative to the ground and the same rigorous control of the wheel plane. The control of body height can enable the height of the vehicle above ground to be varied, for example as a function of speed or of the nature of the ground surface. Active roll control can, for example produce, a counter-roll (a body tilt toward the inside of the curve), i.e. a roll of the body in the direction opposite to that observed in a conventional vehicle.

Another object of the present invention is to provide a more compact arrangement which, for example, leaves more volume available between the wheels, in particular for accommodating the mechanical equipment and/or the passenger compartment.

These and other objects are attained in accordance with one aspect of the present invention directed to a suspended body, at least two wheels each mounted on a wheel support, each wheel support being mounted on a suspension device comprising a suspension support and means for guiding the wheel support relative to the suspension support, the suspension device allowing a vertical displacement of the wheel support relative to the suspension support, the size of the displacement being sufficient to produce the vertical suspension movement required, at least one wheel arranged transversely on one side of the body and at least one other wheel arranged on the other side of the body, in which each suspension support is connected to the body by a height variation mechanism which allows the relative height of the suspension support relative to the body to be varied. Each height variation mechanism is actuated by height control means, and the vehicle has centralised control means for the height control means. The action of the height control means on each side of the body is coordinated so that on that side of the body, the relative height of each suspension support is varied simultaneously. For each wheel the height variation mechanism comprises a device that forms a deformable parallelogram, this parallelogram having the suspension support on one side and being attached on the opposite side to the body of the vehicle, while the height control means enable the parallelogram to be deformed.

Preferably, if the vehicle has at least three wheels with at least one central wheel in the plane of symmetry of the vehicle, the action of the wheel control means is coordinated so as to maintain the longitudinal level of the body during the relative height variations of each suspension support.

Preferably, however, the vehicle will have at least four wheels, at least two of which are arranged transversely on one side of the body with at least two other wheels arranged on the other side. Preferably, for such a vehicle the height control means on the same side comprise a single actuation element.

Preferably, the vehicle comprises four wheels, a front axle and a rear axle, each parallelogram of each wheel having a front and a rear part, the parallelograms of the wheels on the front axle being articulated to the body by their rear part while those of the wheels on the rear axle are articulated to the body by their front part.

Preferably, the parallelograms extend in a plane substantially parallel to the median plane of the vehicle.

Preferably, the parallelograms of the wheels on one side of the vehicle are mechanically interconnected and are controlled by a common actuation element. It is also preferable for the height variation mechanisms to impose, on each of the suspension supports on the same side of the vehicle, height change values that are essentially identical. Preferably, the centralised control means enable height variations on one side of the body different from the height variations on the other side of the body. Preferably, the centralised control means also enable identical height variations on both sides of the body.

Preferably, the vehicle comprises at least one height brake that enables the height control means to be blocked, the said brake being controlled by the centralised control means so as to free the height control means during height variations.

Preferably, the vertical displacement of the suspension device takes place essentially in the wheel plane. It is also preferable for the suspension device to comprise a bar orientated essentially vertically, a sleeve for guiding the said bar in translation, this sleeve being mounted on the support with no possible relative movement in the vertical direction between the sleeve and the support, and the wheel support being mounted by forking over the two ends of the bar. Preferably too, the sleeve is mounted on the support via a pivot which enables the wheel to be steered relative to the support.

BRIEF DESCRIPTION OF THE DRAWINGS

FIG. 1 is a perspective view of a suspension system of the vehicle according to the invention;

FIG. 2 is a partial projection viewed along the wheel axis of the suspension system shown in FIG. 1;

FIG. 3 is a partial vertical projection view of the suspension system of FIG. 1;

DETAILED DESCRIPTION OF THE DRAWINGS

Figure 4:
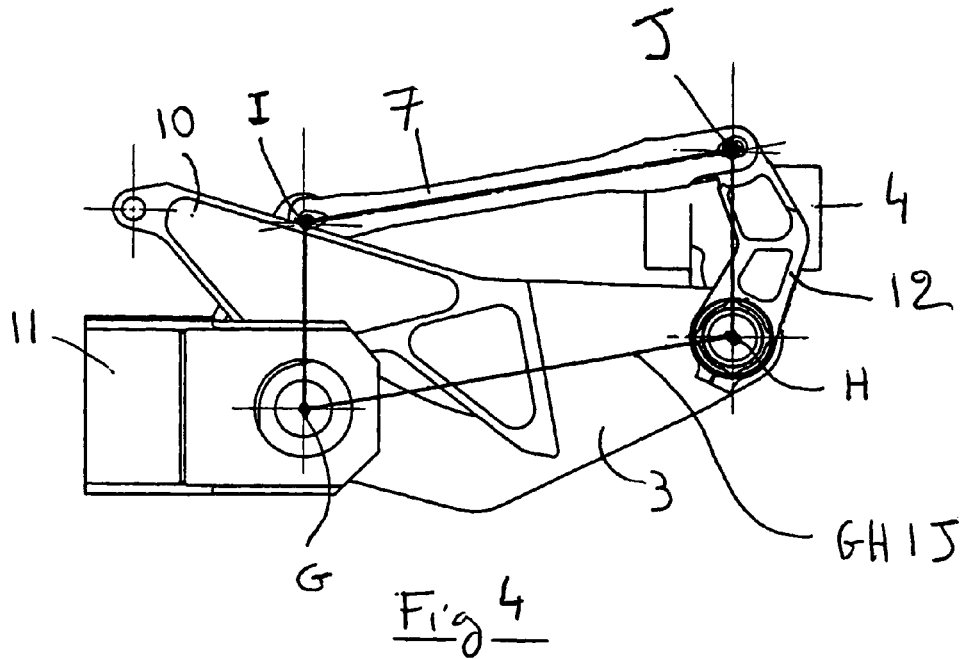
FIGS. 4 and 5 are views similar to that of FIG. 2, for two different positions of a height variation mechanism according to the invention.

FIGS. 1, 2 and 3 show in detail an embodiment of the suspension system of a vehicle according to the invention. Here, the elements shown are the left front wheel guiding elements. The wheel itself is not shown in FIGS. 2 and 3.

In the figures, a wheel 2 is connected to a suspension support 4 via a vertical suspension device 5. The support 4 is connected to the body of the vehicle via a height variation arm 3. The arm 3 can swivel relative to its anchorage 11 on the body around a horizontal and transverse arm axis (ab). In turn, the suspension support 4 can swivel relative to the arm 3 around a support axis (as) which is also horizontal and transverse. It can thus be seen that the arm swivel movements enable the body height to be varied independently of movements of the vertical suspension 5. This illustrates one principle of the invention, according to which the effects of height control are superposed on those of a vertical suspension. The height control concerns variations which are not very rapid, but lasting. This control is preferably organised so that it has low energy consumption. As the suspension, this enables rapid and frequent movements.

The wheel 2 can steer around a pivot axis (ap). The steering is controlled by a steering track rod 8 which acts upon a steering lever 13. The track rod is controlled by a steering rocker 9 mounted to pivot around a vertical rocker axis (ar) on the anchorage (11) of the height variation arm. In turn, the rocker is actuated by a steering system (not shown).

The height variation arm 3 is controlled by a jack (not shown here) connected on the one hand to the body and on the other hand to a projection 10 of the said arm.

In this preferred embodiment, the vertical suspension system is a system using a vertical slide such as that described in patent application EP 0 878 332. This active suspension system uses an electric suspension motor 6 which acts in parallel with a metallic suspension spring (R). This system enables electric control of the vertical suspension. In particular the apparent stiffness of the vertical suspension can be varied, for example to maintain a position centred on the available travel during load variations. In speaking of load variations one thinks in particular of the dynamic variations due to the load transfer when rounding a curve or when driving an off-camber road, and of the static variations due to variable loading of the vehicle. An active suspension system of this type can therefore, on its own, enable the roll to be reduced, compensated or even overcompensated. Preferably however, in the context of the present invention, it is chosen to compensate 100% of the dynamic load variations acting upon the suspension of each wheel via the vertical suspension, and to impose in parallel a counter-roll upon the body via the height variation mechanisms.

Figure 5:
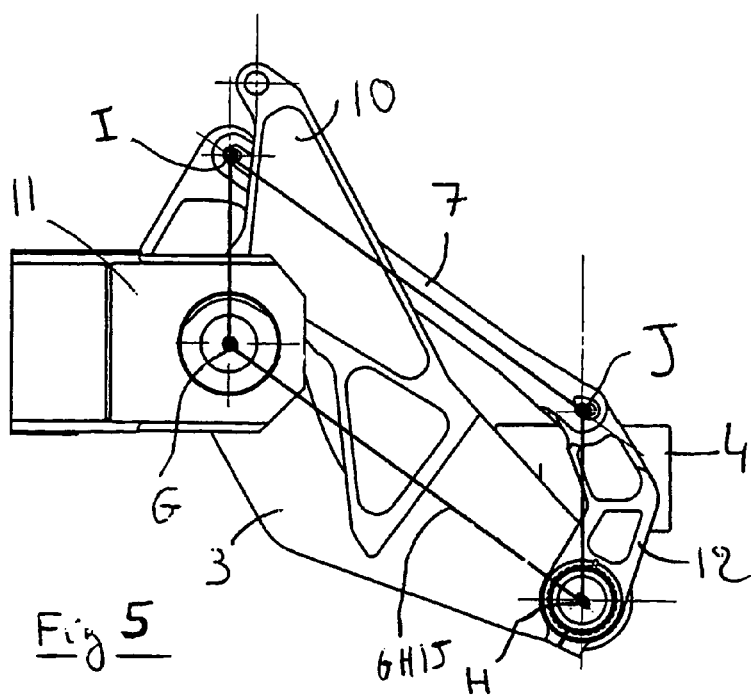

FIGS. 4 and 5 show projections in a vertical, longitudinal plane (for example the plane of symmetry (ps) of the vehicle shown in FIGS. 7 to 10) of the specific elements and operation of the height variation mechanism. FIG. 4 corresponds for example to the low position of the body, i.e. as for the two wheels visible in the vehicle in FIG. 8 and for the right, front wheel of the vehicle in FIG. 10. FIG. 5 corresponds to the high position, i.e. as for the two wheels of the vehicle visible in FIG. 9 or the left wheel of the vehicle in FIG. 10.

It can be seen in FIGS. 4 and 5 that a tie-rod 7 is connected at one end to the anchorage 11 on the body and at the other end to the suspension support 4 via a vertical lever 12. This tie-rod controls the orientation of the support 4 relative to the body when the height variation arm swivels.

With reference to FIG. 1, the letter C denotes the centre of articulation of the track rod 8 on the steering rocker 9 and the letter D denotes the centre of articulation of the track-rod 8 on the steering lever 13.

With reference to FIG. 2, which shows a plan view of the system in a vertical longitudinal plane, the letter A denotes the projection of the arm axis (ab) in the vertical plane, the letter B denotes the projection of the support axis (as) in the vertical plane, the letter C' denotes the projection of the centre of articulation of the track-rod 8 on the steering rocker 9 in the vertical plane, and the letter D' denotes the projection of the centre of articulation of the track-rod 8 on the steering lever 13 in the vertical plane.

With reference to FIG. 3, which shows a plan view of the system in a horizontal plane, the letter C" denotes the projection of the centre of articulation of the track-rod 8 on the steering rocker 9 in the horizontal plane, the letter D" denotes the projection of the centre of articulation of the track-rod 8 on the steering lever 13 in the horizontal plane, the letter E denotes the projection of the rocker axis (ar) in the horizontal plane and the letter F denotes the projection of the pivot axis (ap) in the horizontal plane.

Preferably, the following two geometrical conditions are respected: on the one hand, the projections A, B, C' and D' in a vertical longitudinal plane (see FIG. 2) should form a first parallelogram in the said vertical plane, and on the other hand the projections C″, D″, E and F (see FIG. 3) should form a second parallelogram in the horizontal plane. This way, the steering of the wheel and the height variations remain perfectly independent. In effect, when the height of the body and the steering of the wheel vary, those parallelograms change shape. The deformation related to height variations mainly concerns the first parallelogram (ABC'D') in FIG. 2. The deformation related to steering mainly concerns the second parallelogram (C″D″EF) in FIG. 3.

In practice, imperfect parallelograms can of course be tolerated provided that the steering induced by height variations are acceptable, for example because of limited amplitude or because these induced movements would be otherwise compensated (for example, by means of the steering control).

In this example the support axis (as) and pivot axis (ap) are secants. In the case illustrated here, of a vertical pivot axis passing through the centre of the wheel, this enables the forces undergone in particular by the rod 7 to be limited. The consequence of this particular configuration and of the aforesaid geometrical conditions is that the rocker axis (ar) and the arm axis (ab) are also secants. Naturally, this configuration is not essential. On the contrary, it can be advantageous to offset the said axes, for example for reasons of the space occupied.

FIGS. 1, 2 and 3 show a bracket 14 on the vertical lever 12. In the case of a non-steered wheel this bracket can receive the end of a track rod whose other end is then connected to the steering lever 13 in place of the track-rod 8. In this configuration the steering angle of the wheel is then fixed.

With reference to FIGS. 4 and 5, the letter I denotes the projection, in the vertical longitudinal plane, of the centre of articulation of the rod 7 on the anchorage 11, the letter J denotes the projection of the centre of articulation of the rod 7 on the vertical lever 12, the letter G denotes the projection of the arm axis (ab) and the letter H denotes the projection of the suspension support axis (as). In this vertical plane the points G, H, I and J preferably determine a parallelogram so that the orientation of the suspension support 4 relative to the body does not vary as a function of the body height. The figures show clearly that height variations are obtained directly by the deformation of this parallelogram GHIJ. It can also be understood that when the height variation mechanism is arranged so as to swivel in a vertical plane, i.e. if the arm and support axes are both horizontal and transverse, the height variations can take place virtually without changing track width and the wheel camber variations are then essentially identical to the variations of the tilt of the vehicle, i.e. to the height difference between each side of the vehicle.

In practice the height variation mechanism (3, 7, 11, 12) can constitute an imperfect parallelogram GHIJ provided that the movements induced by the height variations are acceptable, for example because their amplitude is limited.

In the embodiment described here, the suspension support 4 is and remains orientated so that the pivot axis (ap) has a zero castor angle, i.e. it is and remains vertical (if the ground is considered horizontal and camber variations are ignored). If this castor angle is not zero, i.e. if the pivot axis is inclined relative to the vertical, this castor angle can according to the invention be preserved during height variations.

Figure 6:
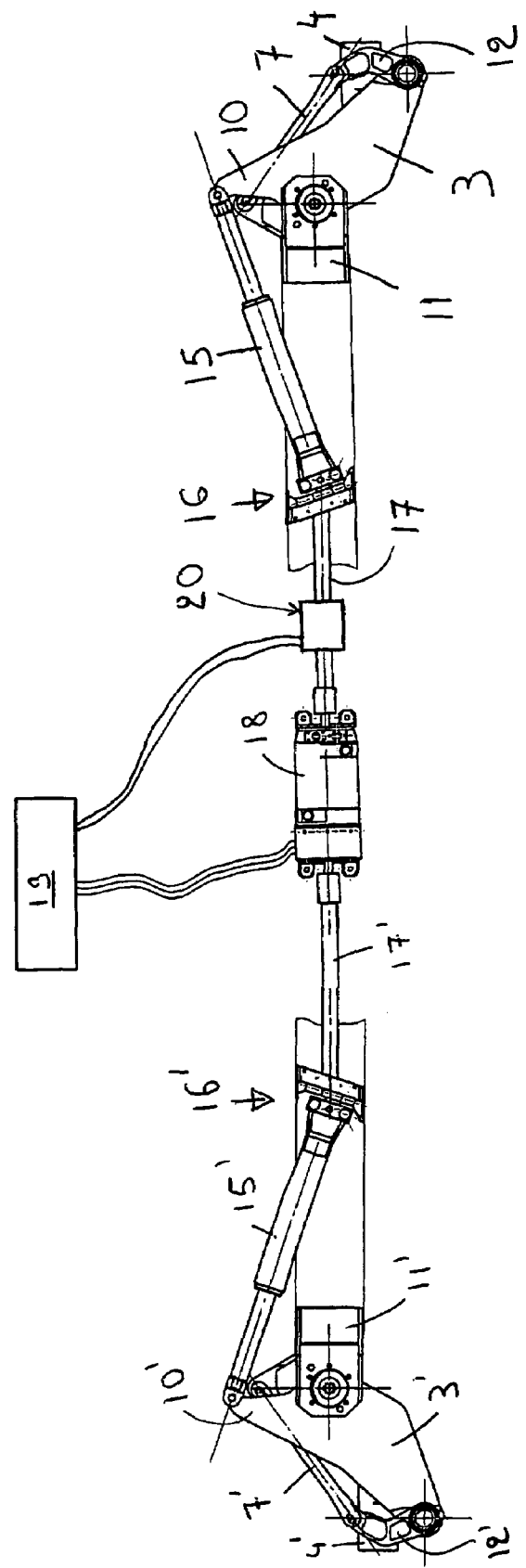
FIG. 6 shows an embodiment of height control means according to the invention.

FIG. 6 shows an embodiment of the assembly of elements that enable height variation on one side of a four-wheeled vehicle. The wheels are not shown. The front of the vehicle is taken to be on the right of the figure. A height variation mechanism of the type described above is incorporated at each end. Each such mechanism preferably forms a parallelogram. The parallelogram (3, 7, 11, 12) of the front axle is articulated at its rear side (11) to the body (1). The parallelogram (3', 7', 11', 12') of the rear axle is articulated at its front part (11') to the body. Each mechanism is controlled by height control means comprising essentially a jack (15, 15'), for example a ball and screw jack, and an actuator, for example an electric motor 18. Each jack is articulated between the body and the projection (10, 10') on the respective height variation arm (3, 3'). A transmission spindle (17, 17') drives the screw and ball jack via a Cardan joint (16, 16'). The dual-output electric motor 18 is common to both height variation mechanisms, so that a mechanical connection links the height variation movements of the front and rear wheels. The electric motor is controlled by centralised control means (19) of the vehicle.

Preferably, a height brake 20 is also provided so as to block the control means when no height variation is needed. This brake can be electrical and can operate as follows: a spring acts permanently to apply the brake and an electromagnet controlled by the centralised control means (19) acts against the spring to release the brake and allow the operation of the height control means. Thus, the energy consumption of the assembly is minimised since on the one hand the actuator does not have to provide any torque for a given position to be maintained, and on the other hand the energy consumption by the height brake is limited to the duration of the height variations. This arrangement is also favourable in term of safety in the event of an electricity supply failure.

The above representation shows that entirely similar elements can be used at both the front and the rear of the vehicle. Preferably, their configuration and operation are symmetrical, i.e. the height variations at front and rear are identical. An advantageous consequence of the fact that the height variations are identical is that this facilitates a good distribution of forces between all the wheels, whether the vehicle has four wheels or more.

This arrangement also makes it possible to vary the wheelbase of the vehicle as a function of the body height. In effect, it is clear here that the wheelbase tends to decrease when the height increases. This improves the handling and clearance properties of the vehicle. Another advantage of this configuration is that the masses are drawn together towards the centre of the vehicle.

Alternatively, an independent actuator can be provided for each wheel and all the actuators on the same side of the vehicle can be controlled in parallel and identically.

Preferably, the centralised control means make it possible on the one hand to automatically adapt the overall height of the vehicle, for example as a function of its speed or of the nature of the ground surface, and on the other hand its roll, for example on the basis of measurements of the transverse acceleration, the yaw speed, the steering wheel angle and the forward speed. For example, it can be advantageous for the vehicle to rise up when at rest in order to facilitate the boarding or alighting of passengers, and for the height then to decrease as the vehicle gathers speed. Preferably, the said centralised control means can also take the driver's choices into account.

FIGS. 7, 8, 9 and 10 show front views of an example of a vehicle according to the invention in typical driving situations.

Figure 7:
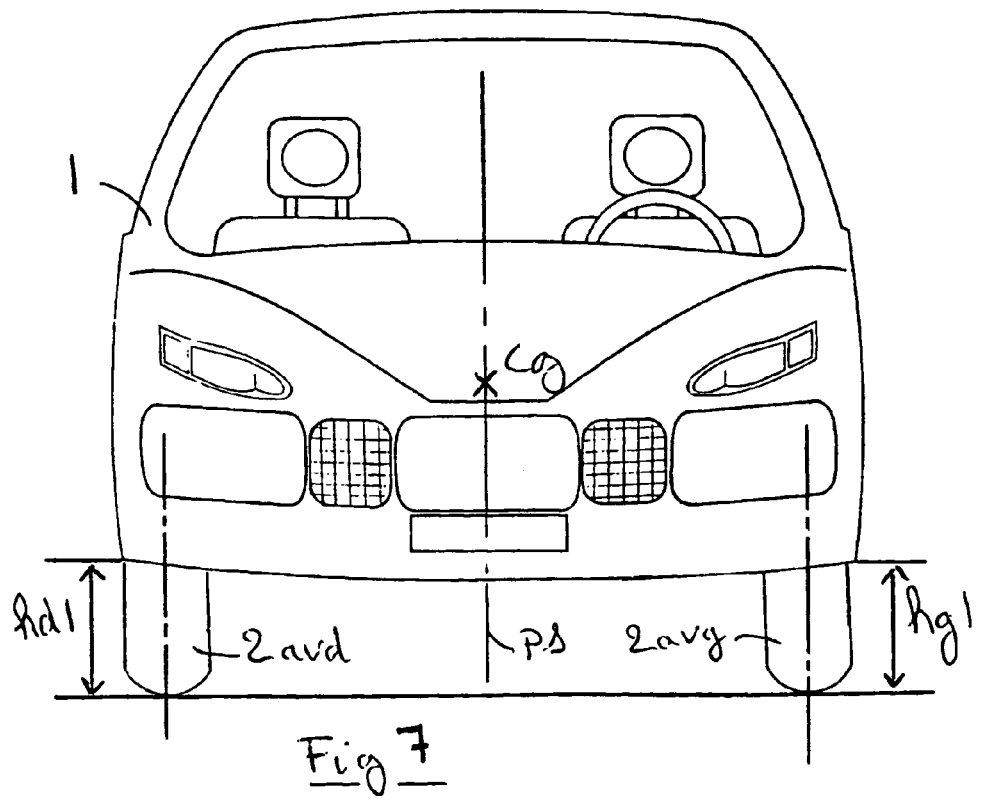
FIGS. 7 to 9 are front views of a vehicle according to the invention driving in a straight line.
Figure 8:
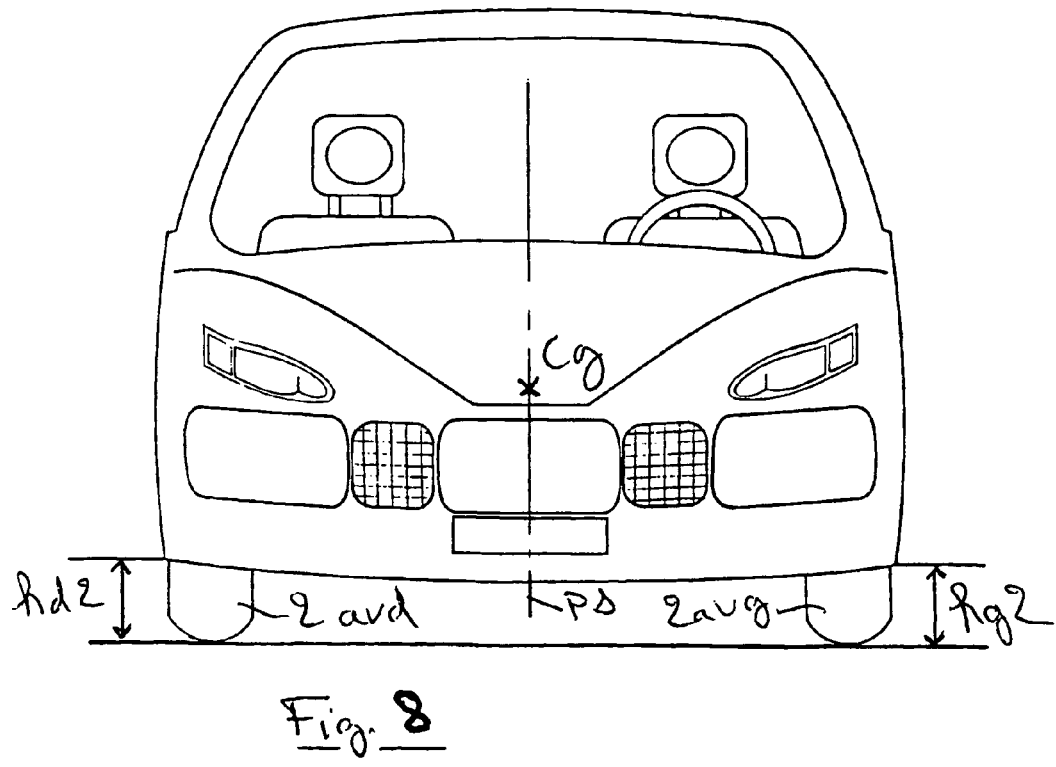
Figure 9:
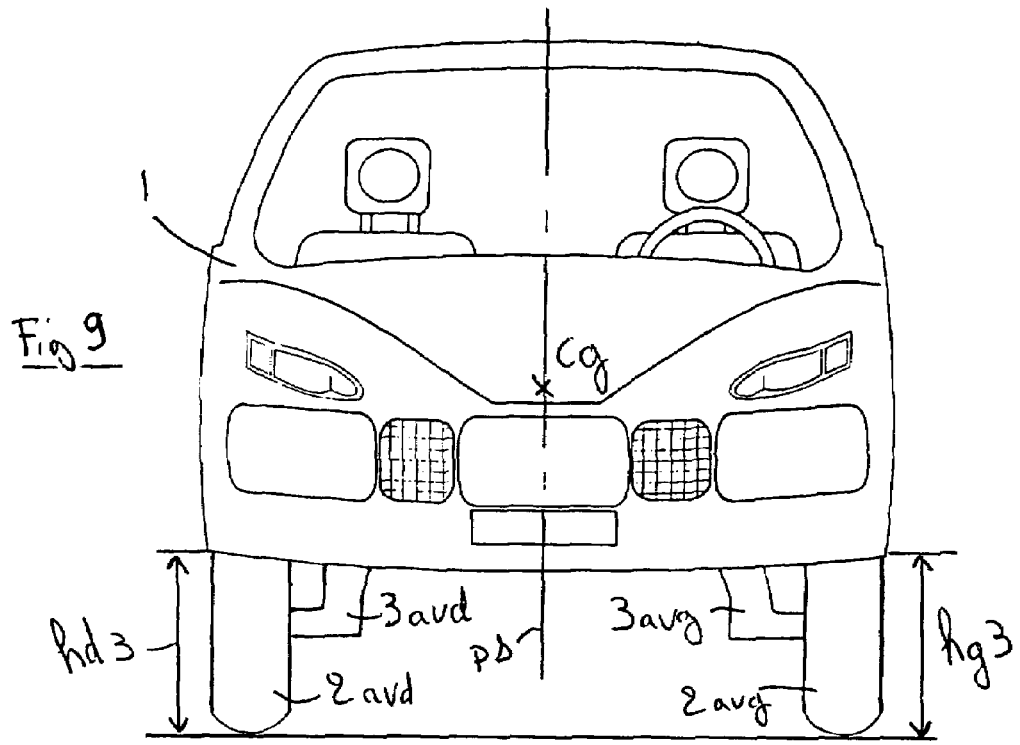

In FIGS. 7, 8 and 9 the vehicle is driving in a straight line along flat and horizontal ground. As in a conventional vehicle, the plane of symmetry (ps) of the body 1 is essentially vertical. The front wheels (right 2avd and left 2avg) are also essentially vertical. They can of course have a non-zero initial camber, as is entirely common. The other wheels cannot be seen in these representations.

If a fixed reference is taken relative to the body, a body height can be defined for each side of the vehicle. In FIG. 7 the height on the right hand side (left in the figure) is "hd1" and that on the left is "hg1", hd1 being essentially equal to hg1. For convenience of description, this height will be called the "mean position".

In FIG. 8 the height of the vehicle is less than in FIG. 7. The height "hd2" on the right and the height "hg2" on the left are lower than hd1 and hg1. This will be called the "low position".

In FIG. 9 the vehicle is higher than in FIG. 7. The height "hd3" on the right and that "hg3" on the left are appreciably greater than hd1 and hg1. This will be called the "high position".

These body height variations can for example be a function of the driving speed of the vehicle and/or the type of surface over which it is driving, or simply of choices made by the driver.

Figure 10:
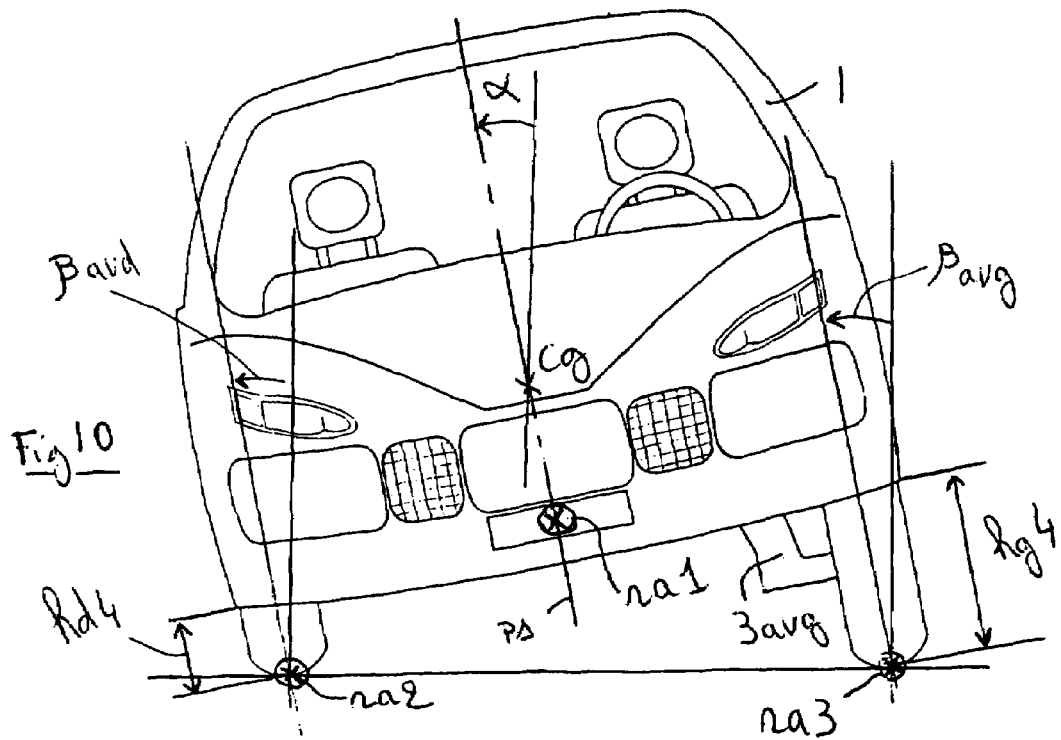
FIG. 10 is a front view of the vehicle shown in FIG. 7 when it is rounding a curve to the right.

In FIG. 10 the same vehicle is rounding a curve to the right, i.e. as viewed from the front it is turning towards the left of the figure. In this situation, in contrast to a conventional vehicle, the body 1 of the vehicle according to the invention can be tilted towards the inside of the curve (by an angle α). Similarly, the wheels are also tilted towards the inside of the curve (by angles αavd for the front right wheel and αavg for the front left wheel). The other wheels, not visible here, adopt similar positions. Preferably, the camber variations are substantially equal to the body roll variation (disregarding elastic deformations).

Comparing FIG. 10 with FIGS. 7, 8 and 9, it can be seen that the counter-roll position represented here results mainly from the combination of a high position on the side towards the outside of the curve and a low position on the side towards the inside of the curve.

Adopting the mean position of FIG. 7 as reference, the counter-roll of FIG. 10 results from the combination of a height increase on the right side and a height reduction on the left side. In other words, the tilt of the body corresponds in this case to rotation about a roll axis (ra1) located close to the plane of symmetry (ps) of the vehicle.

If the low position of FIG. 8 is taken as reference, this same counter-roll results from a body height increase on the outside of the curve. The body height on the inside of the curve (on the left in FIG. 10) has hardly changed at all. In this case the corresponding roll axis (ra2) passes through the centres of the wheel contact areas on the inside of the curve (on the left in FIG. 10).

Finally, taking the high position of FIG. 9 as reference, the counter-roll results from a body height reduction on the left side of the vehicle. In this case the roll axis (ra3) passes through the centres of the wheel contact areas on the outside of the curve (on the right of FIG. 10).

In fact, depending in particular on the initial height of the vehicle, its tilt can be varied by acting on the height on one side or the other, or both together, in appropriate proportions. Naturally, the position of the instantaneous roll axis (ra) depends on that choice. Strictly speaking, the definition of a roll axis is a dynamic definition, i.e. the actual or theoretical position of that axis certainly varies all the time as a function of the height variations of each wheel of the vehicle. When rounding a curve, and to the extent necessitated as a function of the transverse acceleration, it is preferable first to reduce the height on the inside and then to increase the height on the outside of the curve.

It is understood that the examples given above are schematic and are above all intended to illustrate the invention.

FIG. 10 also illustrates an advantageous characteristic of the vehicle according to the invention, according to which its centre of gravity (cg) is displaced towards the wheels on the inside of the curve.

In FIGS. 9 and 10 the height variation arms at front left (3avg) and front right (3avd), which give rise to the transitions between the configurations of the various figures, can also be seen.

The reference to mean, low and high positions is made only for illustrative purposes. Naturally, the body heights can have any number of values between a minimum and a maximum height.

As has been mentioned, the invention can be applied in a vehicle having only two wheels arranged transversely. In this case, according to the invention the height, the tilt of the body, and preferably also the wheel camber can be varied by acting on the height control of each wheel on one side or the other, or both together, as described in the figures relating to a four-wheeled vehicle.

The invention can also be applied to a vehicle having an even or odd number of wheels of which at least one is arranged in the plane of symmetry of the vehicle. This is the case for example in a vehicle with three wheels arranged in a triangle, but also a vehicle with four wheels arranged in a diamond pattern. In this case, according to the invention the height, body tilt and preferably also the wheel cambers can be varied by acting on the height control of each wheel on one side or the other, or both together as described in the figures for a four-wheeled vehicle. The height of the central wheel(s) can then preferably be controlled so as to maintain the vehicle horizontal. The height of the central wheel(s) can also remain fixed, especially in the case of a vehicle with three wheels arranged in a triangle.

The vehicle represented in the figures has a rigid body (1), which either supports the anchorages (11) directly or is attached to a chassis which itself supports the said anchorages. In either case the invention enables the roll of the body (and thus of its passenger compartment) to be controlled without recourse to an articulation specific to the body or passenger compartment relative to the suspension system, as is necessary in the vehicle described in application EP 0 878 378.

The figures illustrate a preferred embodiment of the invention. However, numerous variants can be imagined. For example, although the height variation mechanisms preferably act in a longitudinal plane of the vehicle, those with knowledge of the field will understand that a different orientation is possible if its consequences, such as track variation and mechanical overall size are acceptable. Another example is that the axis (ab) of the arm and the support axis (as) need not necessarily be rigorously parallel. Depending on these choices, one can define greater or smaller manufacturing and assembly tolerances.

The expression "ground contact system" is commonly used to denote the set of elements between the ground and the body or chassis of a vehicle. The ground contact system of the vehicle according to the invention not only provides vertical suspension, but also allows a wheel camber modification at any time without, for all that, reducing the vertical suspension travel either in compression or in rebound, and while maintaining the vertical suspension in optimum operating conditions, in particular because the control of the camber angle allows a reduction of the torques and shearing forces involved in the guiding of the vertical suspension. Of course, one cannot act directly on the camber of a wheel relative to the ground; this is done indirectly, by means of vehicle height variations.

The invention is preferably applied in passenger cars, but can be implemented in vehicles of any type.

We claim:

1. A vehicle comprising:
   a suspended body,
   at least two wheels each mounted on a wheel support, each wheel support being mounted on a suspension device comprising a suspension support and means for guiding the wheel support relative to the suspension support, the suspension device allowing a vertical displacement of the wheel support relative to the suspension support, the size of the displacement being sufficient to produce a vertical suspension movement required, and
   at least one first wheel of the at least two wheels being arranged transversely on one side of the suspended body and at least one second wheel of the at least two wheels being arranged on the other side of the suspended body, wherein
   for each of the first and second wheels, each suspension support is connected to the suspended body by a height variation mechanism which allows the relative height of the each suspension support relative to the suspended body to be varied,
   each height variation mechanism is actuated by a height control means,
   the vehicle centralized further comprises centralized control means controlling the height control means,
   wherein control of the height control means on each side of the suspended body is coordinated so that on that side of the suspended body, the relative height of each suspension support is varied simultaneously, and
   each height variation mechanism comprises a device having four pivot points that form a deformable parallelogram in the median plane of the vehicle, said parallelogram receiving on one side the respective suspension support and being permanently attached on the other side to the suspended body, the height control means enabling said parallelogram to be deformed.

2. The vehicle according to claim 1, wherein the at least two wheels comprise at least three wheels, at least one of the at least three wheels being arranged in the median plane of the vehicle in which the action of the height control means is coordinated so as to maintain the longitudinal level of the suspended body during relative height variations of each suspension support.

3. The vehicle according to claim 1, wherein the at least two wheels comprise at least four wheels, at least two of the at least four wheels are arranged transversely on one side of the body while at least two other wheels of the at least four wheels are arranged on the other side of the body.

4. The vehicle according to claim 3, wherein the height control means on the same side of the suspended body comprise a single actuator.

5. The vehicle according to claim 1, further comprising a front axle and a rear axle, the at least two wheels comprise only two front wheels mounted on the front axle and two rear wheel mounted on the rear axle, the parallelogram of each wheel having a front part and a rear part, the parallelogram of each front wheel being articulated to the suspended body by the rear part thereof while the parallelogram of each rear wheel being articulated to the suspended body by the front part thereof.

6. The vehicle according to claim 3, wherein the parallelograms of the wheels on the same side of the vehicle are mechanically interconnected and are controlled by a common actuator.

7. The vehicle according to claim 3, wherein the height variation mechanisms impose on the respective suspension supports on the same side of the vehicle height change values which are essentially identical.

8. The vehicle according to claim 1, wherein the centralized control means enable height variations on one side of the suspended body which are different from height variations on the other side of the suspended body.

9. The vehicle according to claim 1, wherein the centralized control means enable identical height variations on both sides of the suspended body.

10. The vehicle according to claim 1, further comprising at least one height brake which enables the height control means to be blocked, said brake being controlled by the centralized control means in such manner as to free the height control means during height variations.

11. The vehicle according to claim 1, wherein the vertical displacement of each suspension device takes place essentially in a respective wheel plane.

12. The vehicle according to claim 11, wherein each suspension device comprises a bar orientated essentially vertically and a sleeve that guides the bar in translation, the sleeve being mounted on the respective suspension support with no possible relative movement in the vertical direction between the sleeve and the suspension support, the respective wheel support being mounted forked over two ends of the bar.

13. The vehicle according to claim 12, wherein each sleeve is mounted on the respective suspension support via a pivot which allows the respective wheel to be steered relative to the suspension support.

* * * * *